US012454422B2

(12) United States Patent
Cerny et al.

(10) Patent No.: US 12,454,422 B2
(45) Date of Patent: Oct. 28, 2025

(54) HYBRID STARWHEEL SYSTEM FOR INSPECTING AN EMPTY BOTTLE

(71) Applicant: INDUSTRIAL DYNAMICS COMPANY, LTD., Torrance, CA (US)

(72) Inventors: Darin Cerny, Hayward, CA (US); Robert T. Catalanotti, Jr., Lakewood, CA (US); Justin McJones, Rancho Palos Verdes, CA (US); Dave Petersen, Torrance, CA (US); Ranch Peterson, Torrance, CA (US); Andy Barmeyer, Orange, CA (US); Ron Wilson, Sherman Oaks, CA (US)

(73) Assignee: INDUSTRIAL DYNAMICS COMPANY, LTD., Torrance, CA (US)

( * ) Notice: Subject to any disclaimer, the term of this patent is extended or adjusted under 35 U.S.C. 154(b) by 94 days.

(21) Appl. No.: 18/235,377

(22) Filed: Aug. 18, 2023

(65) Prior Publication Data
US 2024/0059501 A1 Feb. 22, 2024

Related U.S. Application Data

(60) Provisional application No. 63/399,793, filed on Aug. 22, 2022.

(51) Int. Cl.
*B65G 47/84* (2006.01)
*B65G 47/42* (2006.01)
*B65G 47/82* (2006.01)

(52) U.S. Cl.
CPC ........... *B65G 47/846* (2013.01); *B65G 47/42* (2013.01); *B65G 47/82* (2013.01);
(Continued)

(58) Field of Classification Search
CPC .. B65G 29/00; B65G 47/846; B65G 47/2445; B65G 47/84; B65G 47/82; G01N 21/8806; G01N 21/9009; G01N 21/9036
(Continued)

(56) References Cited

U.S. PATENT DOCUMENTS 3,589,513 A 6/1971 Bolton
3,651,937 A 3/1972 Kronseder
(Continued)

OTHER PUBLICATIONS

International Search Report and Written Opinion, PCT/US23/30559, mailed Nov. 9, 2023.

*Primary Examiner* — James R Bidwell
(74) *Attorney, Agent, or Firm* — Joseph Englander, Esq.; Lewis Brisbois Bisgaard & Smith LLP

(57) ABSTRACT

A system for inspecting bottles includes a conveyor conveying bottles at a first speed. A starwheel, rotating at a second speed, less than the first speed, receives each bottle. Sensors are disposed adjacent the starwheel for detecting at least one of a residual liquid in the bottle and a defect in the bottle. The starwheel deposits each bottle on the conveyor at a downstream position. An outer sidewall inspection system, disposed along the path, has a first camera assembly and a second camera assembly disposed along the path and each bottle passes therebetween. A first belt is disposed along the conveyor in facing relation with a second belt to rotate the bottle. The outer sidewall inspection system has a third camera assembly and a fourth camera assembly disposed along the path, downstream of the first belt; each bottle passing between the third camera assembly and the fourth camera assembly.

15 Claims, 6 Drawing Sheets

(52) U.S. Cl.
CPC ............... *B65G 2201/0244* (2013.01); *B65G 2203/0216* (2013.01); *B65G 2203/041* (2013.01); *B65G 2203/042* (2013.01); *B65G 2207/14* (2013.01)

(58) Field of Classification Search
USPC ...................................................... 198/478.1
See application file for complete search history.

(56) References Cited

U.S. PATENT DOCUMENTS

| | | | | |
|---|---|---|---|---|
| 3,932,042 | A | * | 1/1976 | Faani ..................... B07C 5/126 |
| | | | | 209/524 |
| 5,028,769 | A | | 7/1991 | Claypool et al. |
| 5,729,340 | A | * | 3/1998 | Griesbeck ............... B07C 5/122 |
| | | | | 356/240.1 |
| 5,917,602 | A | | 6/1999 | Bonewitz et al. |
| 7,760,350 | B2 | | 7/2010 | Hill |
| 9,665,933 | B2 | | 5/2017 | Herrmann et al. |
| 2007/0127018 | A1 | | 6/2007 | Lindner et al. |
| 2018/0172602 | A1 | | 6/2018 | Beck |
| 2020/0361717 | A1 | * | 11/2020 | Bauer .................... B65G 47/82 |
| 2021/0178431 | A1 | | 6/2021 | Kress et al. |

* cited by examiner

HYBRID STARWHEEL SYSTEM FOR INSPECTING AN EMPTY BOTTLE

CROSS REFERENCE TO RELATED APPLICATIONS

This application claims the benefit of U.S. Provisional Application No. 63/399,793 filed on Aug. 22, 2022. The entire contents of this application is incorporated herein by reference in its entirety.

BACKGROUND OF THE INVENTION

The present invention is directed to a system for inspecting the quality of empty bottles prior to filling, and more particularly, for providing a system for inspecting bottles which is simpler in construction and implementation, and requires less of an area footprint by combining a starwheel structure with a linear chain structure.

As known in the art, an Empty Bottle Inspector (EBI) is an inspection system for inspecting the quality of bottles prior to filling on a beverage production line. It ensures that broken bottles, foreign bottles, and bottles with contamination, either inside or outside, are rejected prior to the filler. One current approach is a starwheel system for performing Base (B), Inner Sidewall (ISW), Finish (F), Residual Liquid (RLD), and Thread (T) inspections (B-ISW-F-RLD-T), with upstream outer sidewall (OSW) inspection being done serially.

It is also known in the art to use a linear system, which has OSW inspection upstream and downstream of a side grip conveyor where critical B-ISW-F-RLD-T inspections are performed at stations along the conveyor. Each approach independently requires significant line controls for managing the bottles as they enter the inspection area. The starwheel is considered the best mechanism for B-ISW-F-RLD-T inspections as it firmly holds the bottle, while the linear system is best for OSW inspections as the side grip conveyor ensures 90-degree bottle rotation.

While the prior art is satisfactory, the linear system suffers from the disadvantage that it requires multiple belts to perform each of the inspections, and complex control of the movement of each of those belts to align the bottles at proper spacing for accurate inspection. The linear system also requires multiple chains to convey the belts through the system, which in turn require multiple motors, multiple associated motor controls, to enable transfer from chain to chain, inspection station to inspection station, at proper spacing for linear positioning. The multiple belts, motors and controls also result in a large footprint for the device, wasting valuable warehouse space.

Additionally, the prior art linear inspection system suffers from the disadvantage that in order to perform Base, Inner Sidewall, Thread and Finish inspections, the individual bottle is held above the chain by opposed belts in order to expose the base. When held by the belts, and not supported by the chain, there is a tendency of the bottle to tilt unless the opposed belts are perfectly synchronized. A tilted bottle can cause inaccurate test results.

Additionally, it is known in the art to perform outer sidewall testing using a light panel for back illumination of the bottle and a matrix camera for imaging the bottle. However, this structure, and testing method, is prone to produce shadowing in the shoulder and sides of the bottle unless a very large panel light source is used as compared to the size of the bottle, again increasing the footprint of the system.

Accordingly, a system which overcomes the shortcomings of the prior art is desired.

SUMMARY OF THE INVENTION

A hybrid starwheel system for inspecting the quality of empty bottles includes a conveyor conveying one or more bottles along a path in a single direction. The conveyor conveys bottles at a first speed. A starwheel, disposed along the path, receives each of the one or more bottles, the starwheel rotating at a second speed, relative to the path; the second speed being less than the first speed. One or more sensors are disposed adjacent the starwheel for detecting at least one of a residual liquid in the bottle and a defect in one of the base of the bottle, the inner sidewall of the bottle, the finish of the bottle or the thread of the bottle. The starwheel deposits each bottle on the conveyor at a position along the path downstream of the starwheel. An outer sidewall inspection system is disposed along the path, downstream of the starwheel and receives each bottle. The outer sidewall inspection system has a first camera assembly and a second camera assembly disposed along the path so that each bottle passes between the first camera assembly and the second camera assembly. A first belt is disposed along the conveyor, downstream of the second camera assembly, on a first side of the conveyor. A second belt is disposed along the conveyor, downstream of the second camera assembly, on a second side of the conveyor in facing relation with the first belt. The first belt and second belt rotating the bottle as the bottle passes therebetween. The outer sidewall inspection system has a third camera assembly and a fourth camera assembly disposed along the path, downstream of the first belt so that each bottle passes between the third camera assembly and the fourth camera assembly.

In one embodiment the first belt moves parallel to the path at a third speed and the second belt moves parallel to the path at a fourth speed; different than the third speed causing the bottle to rotate as it travels between the first belt and the second belt. In one embodiment of the invention, the bottle rotates 90 degrees.

In another embodiment of the invention, the first camera assembly has at least one line scan camera. An illumination source is provided. The bottle passing between the at least one line scan camera and the illumination source as it traverses the path.

In an additional embodiment, the first camera assembly has a color line scan camera. An illumination source is provided. The bottle passing between the color line scan camera and the illumination source as it traverses the path. The color line scan camera detecting defects on an applied ceramic label of the bottle.

In yet another embodiment of the invention, the outer sidewall inspection system has a code reader assembly disposed along the path, between the second camera assembly and third camera assembly. The code reader assembly has at least one track and trace code reader. The bottle passing the at least one track and trace code reader as it traverses the path. The at least one track and trace code reader scanning a machine readable optical image affixed thereon to the bottle.

An additional embodiment of the invention has the first camera assembly disposed upstream of the second camera assembly, and the third camera assembly disposed upstream of the fourth camera assembly.

In another embodiment of the Invention, the hybrid starwheel system has at least one rejector downstream of the fourth camera assembly. The bottle deflected off the path by the rejector.

BRIEF DESCRIPTION OF THE DRAWINGS

The features and advantages of the present invention will become more readily apparent from the following detailed description of the invention in which like elements are labeled similarly and in which.

DETAILED DESCRIPTION OF THE PREFERRED EMBODIMENTS

Figure 1:
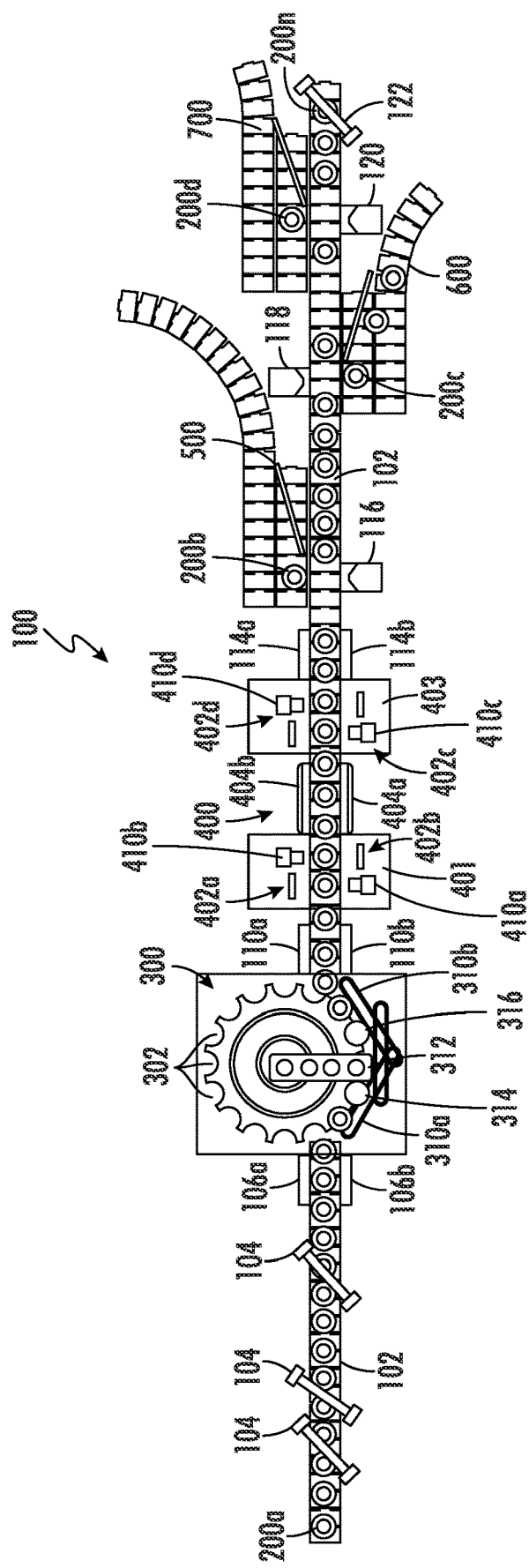
FIG. 1 is a top plan view of a hybrid starwheel system for inspecting the quality of empty bottles in accordance with the invention during operation.

Reference is first made to FIG. 1 in which a hybrid starwheel system for inspecting the quality of empty bottles, constructed in accordance with the invention, and generally indicated as 100, is shown. System 100 includes a chain, or conveyor, 102 for defining a path along which chain 102 conveys one or more bottles 200a-200n. Beginning upstream along conveyor 102 and working downstream, one or more bottle presence detectors 104 are disposed along the path of conveyor 102 to detect the presence of bottles 200. This begins the operation and timing of system 100 and informs the controls of starwheel 300 to speed up or slowdown.

High frequency sensors 106a, 106b are disposed in facing relationship across conveyor 102, downstream from bottle presence detectors 104, along the path formed by conveyor 102. High frequency sensors 106a, 106b determine the presence of caustic substances and/or residual liquid within each bottle 200 passing therebetween.

Starwheel 300 is disposed downstream of high frequency sensors 106a, 106b and receives respective bottle 200 from conveyor 102 within a respective receiving slot 302 as starwheel 300 rotates; bringing each slot 302 into a substantially parallel orientation with the path, in turn. In this way starwheel 300 serially receives and carries bottles 200 along the path as starwheel 300 rotates. In a preferred nonlimiting embodiment belts 310a, 310b are provided adjacent starwheel 300 to maintain respective bottles 200 within receiving slots 302 as starwheel 300 conveys bottles 200 along the path.

A sensor array 312 utilizes mirrors disposed at 45 degrees relative to the light path (not shown) to direct a light to sensor array 312 as each bottle 200 passes thereunder. In this way utilizing the sensor array 312, system 100 performs Base, Inner Sidewall, and Residual Liquid inspections as known in the art. System 100 performs Thread and Finish inspections at positions immediately upstream and downstream of sensor array 312 in one embodiment of the invention. A thread inspecting sensor 314 is disposed upstream of sensor array 312 and a finish inspecting sensor 316 is disposed downstream of sensor array 312. However, it is within the scope of the invention for both thread inspecting sensor 314 and finish inspecting sensor 316 to be either downstream or upstream of sensor array 312.

As a result of rotation of starwheel 300, starwheel 300 then deposits each respective bottle 200, downstream of sensor array 312 onto conveyor 102. It should be noted that during operation conveyor 102 travels at a first speed along the path. Starwheel 300 travels at a second speed along the path which is less than the first speed. As a result, bottles 200 are gapped a predetermined distance as bottles 200 leave starwheel 300. In a preferred nonlimiting embodiment, the second speed is about ten to twenty percent less than the first speed.

In a preferred non limiting embodiment, high frequency sensors 110a, 110b are disposed in facing relationship across conveyor 102, downstream from starwheel 300, along the path formed by conveyor 102. High frequency sensors 110a, 110b determine the presence of caustic substances and/or residual liquid within each bottle 200 passing therebetween. The redundancy downstream reduces the likelihood of bottle 200 with caustic substances being filled.

Figure 2:
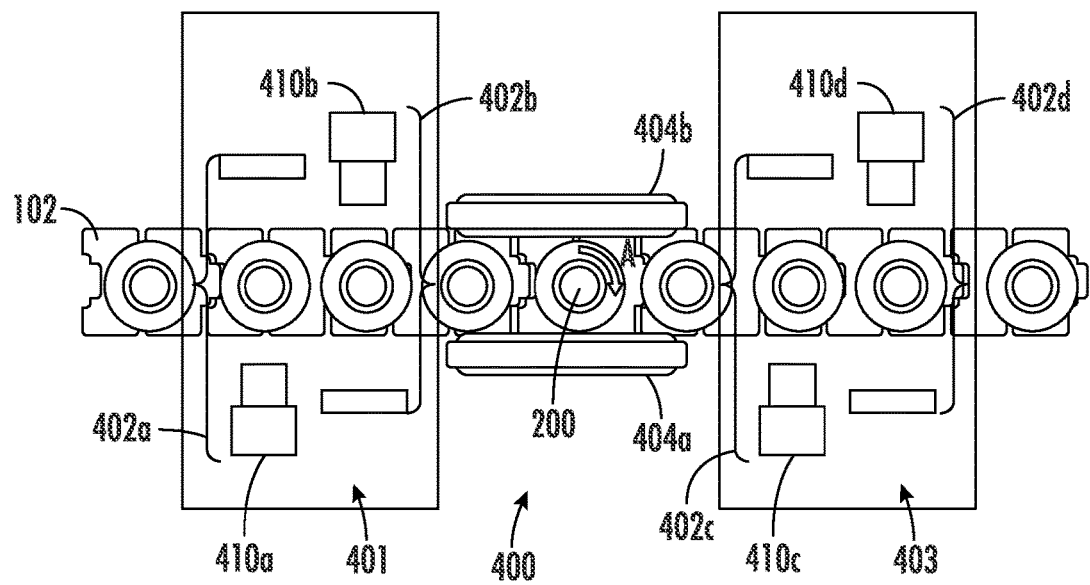
FIG. 2 is a top plan view of the outer sidewall inspection portion of the system constructed in accordance with the invention during use.
Figure 3:
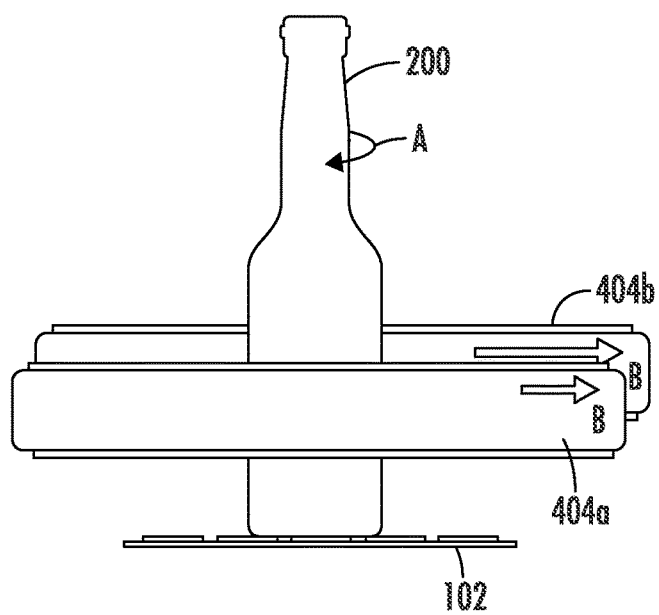
FIG. 3 is a perspective view of a bottle traversing the belt portion of the outer sidewall inspection portion in accordance with the invention.
Figure 4:
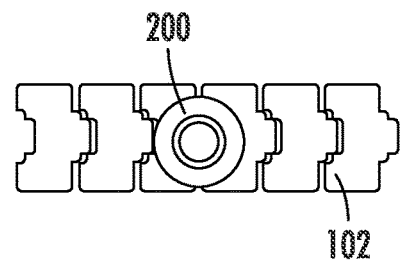
FIG. 4 is a top plan view of a bottle traversing a portion of the system.

Reference is now made to FIGS. 2 and 3 showing how each bottle 200 is then subjected to outer sidewall inspection at an outer sidewall inspection station generally indicated as 400 located downstream along the path from high frequency sensors 110a, 110b. Outer sidewall inspection station 400 includes a first camera pair inspection system 401 having a first camera assembly 402a and a second camera assembly 402b; each of which is disposed across conveyor 102. As will be described below, each of first camera assembly 402a and second camera assembly 402b includes a camera, 410a, 410b, respectively, disposed on a side of the conveyor 102 to face bottles 200 traversing the path on conveyor 102. Camera 410a of first camera assembly 402a is disposed on an opposed side of conveyor 102 from camera 410b of the second camera assembly 402b. In this way, first camera assembly 402a scans a first side of bottle 200 as it traverses the path and second camera assembly 402b scans a second, substantially opposed, side of bottle 200 as it traverses the path.

A first belt 404a is disposed downstream of first camera pair inspection system 401. A second belt 404b is disposed downstream of first camera pair inspection system 401 across conveyor 102 in facing spaced relation with first belt 404a. Each of belts 404a and 404b contact a side of bottle 200 as it travels therebetween. Each of belts 404a move in the direction of arrows B, but at different speeds relative to each other causing bottle 200 to rotate in the direction of arrow A (See FIGS. 2,3). As seen from FIG. 3, bottle 200 is supported by the chain of conveyor 102 while operated upon by belts 404a, 404b. This ensures the stability of the bottle during the OSW inspection process and reduces the pressure needed at the sides of the bottle to hold and turn the bottle.

Because of the nature of light and cameras 410a, 410b, the sides, the surfaces of bottle 200 at a relatively 90 degree angle to cameras 410a, 410b of inspection system 401, are not captured; i.e. inspected. Each camera 410a, 410b captures substantially 110 degrees across bottle 200. Therefore bottle 200 is rotated substantially 90 degrees by belts 404a, 404b and transported downstream to a second camera pair inspection system 403. In this way, the sides which may have previously been hidden from the field of view of cameras 410a, 410b are now facing cameras 410c, 410d. Second camera pair inspection system 403 has a structure substantially identical to first camera pair inspection system 401.

A second camera pair inspection system 403 has a third camera assembly 402c and a fourth camera assembly 402d; each of which is disposed across conveyor 102. As will be described below, each of third camera assembly 402c and fourth camera assembly 402d includes respective cameras 410c, 410d disposed on a side of conveyor 102 to face bottles 200 traversing the path on conveyor 102. Camera 410c of third camera assembly 402c is disposed on an opposed side of conveyor 102 from camera 410d of the fourth camera assembly 402d. In this way, third camera assembly 402c scans one, now turned, side of bottle 200 as it traverses the path and fourth camera assembly 402d scans a substantially opposed side of bottle 200 as it traverses the path. As a result of the rotation, the entire surface, 360 degrees, of bottle 200, and its outer side wall, have now been scanned, with an additional 20 degrees per bottle side of overlap, by outer sidewall inspection station 400. This overlap allows for redundancy and also addresses possible over or under rotation of bottle 200 by belts 404a, 404b.

Figure 6:
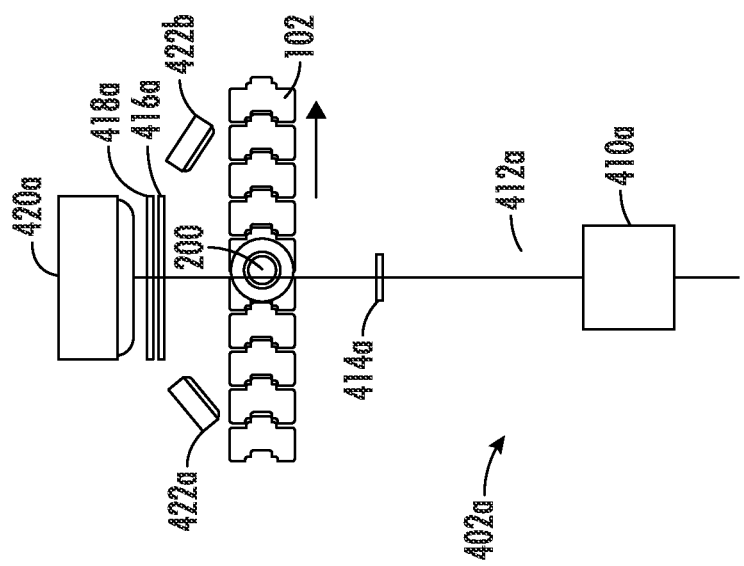
FIG. 6 is a top plan view of a camera system constructed in accordance with the invention shown inspecting a bottle.
Figure 5:
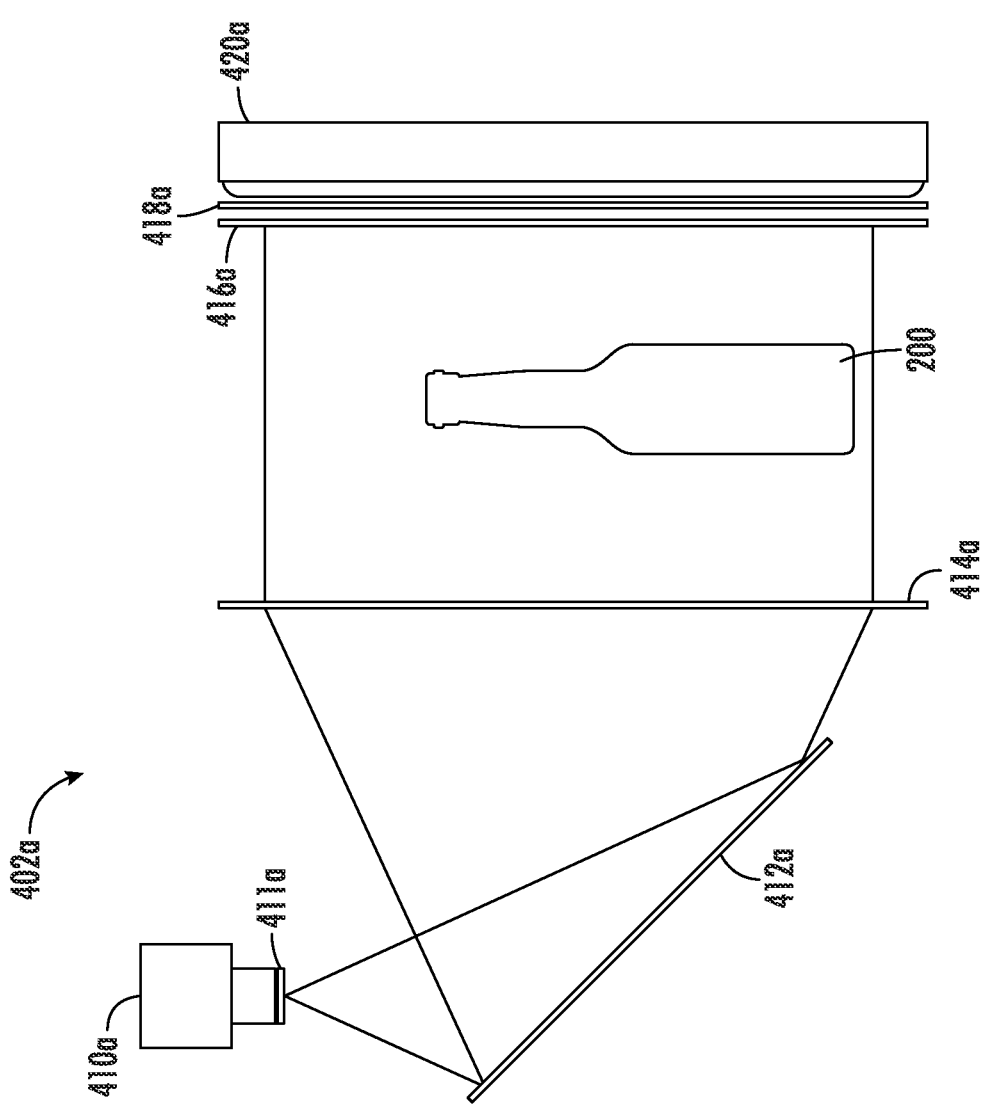
FIG. 5 is a side elevation view of a camera system constructed in accordance with the invention shown inspecting a bottle.

Reference is now made to FIGS. 5, 6 in which camera system 402a, exemplary of each camera system 402a-402d in outer sidewall inspection station 400 is described in greater detail. A light source 420a is disposed on one side of conveyor 102 to project light towards passing bottle 200. Light from light source 420a is diffused by a diffuser 418a and then polarized by a circular polarizer 416a before illuminating bottle 200 travelling along conveyor 102 as light travels through bottle 200. Light source 420a, diffuser 418a and circular polarizer 416a are all on a first side of bottle 200 along the light path.

A linear Fresnel lens 414a is on the opposite side of bottle 200 along the light path from light source 420a and receives light passing through bottle 200 to focus the light exiting bottle 200 for a linear receiver. A mirror 412a, angled at a substantially 45 degree angle to the linear Fresnel receiver 414a, in a preferred non limiting embodiment, receives the light and angles the light to a circular polarizer 411a associated with line scan camera 410a, so that bottle 200 is inspected one vertical pixel wide slice at a time.

As can be seen from FIG. 6, line scan camera 410a scans bottle 200 as bottle 200 moves through a single plane. Each image taken by line scan camera 410a across bottle 200 is "stitched" together to form an image across the entire surface. The use of line scan camera 410a results in a more uniform image with less shadowing, enabling use of a smaller light source while still maintaining higher resolution. As seen from FIG. 6 in particular, by utilizing mirror 412a and smaller light source 420a enabled by line scan inspection, an overall smaller footprint is provided while increasing sensitivity to defects. Camera system 402a was used by way of nonlimiting example, each camera system having similar structure. In an additional embodiment, additional light sources 422a, 422b may be provided to reduce shadowing.

In a preferred non limiting embodiment, high frequency sensors 114a, 114b are disposed in facing relationship across conveyor 102, downstream from outer sidewall inspection station 400, along the path formed by conveyor 102. High frequency sensors 114a, 114b provide redundancy to further determine the presence of caustic substances and/or residual liquid within each bottle 200 passing therebetween.

A test loop disposed downstream of high frequency sensors 114a, 114b along the path includes a test loop conveyor 500 and a finger rejector (or other type of rejector) 116, opposite conveyor 500 across conveyor 102, for deflecting selected bottles 200b for diversion for queueing for subsequent automated test bottle runs.

A destruction station disposed downstream of the test loop along conveyor 102 includes an unsalvageable conveyor 600 for removing bottles 200 for destruction and/or recycling. A finger rejector (or other type of rejector) 118 is disposed opposite conveyor 600 across conveyor 102, for deflecting selected bottles 200c for diversion for destruction or recycling.

A return to washer station is disposed along conveyor 102 downstream of unsalvageable conveyor 600 and includes a return to washer conveyor 700 disposed on one side of conveyor 102. A finger rejector (or other type of rejector) 120 is disposed across conveyor 102 in facing relationship with return to washer conveyor 700 and deflects bottles 200d which the upstream sensors have determined are in need of further washing to return to washer conveyor 700.

Those bottles 200 which have not been deflected are then processed by at least one more sensor 122 disposed along conveyor 102 as a reject verify and back up sensor.

Bottle 200 with thick glass, embossing, or modeling features, such as but not limited to dimples, flutes, and swirls, reduces the amount of light passing through bottle 200, which in turn creates the problem of shadowing that decreases the probability of accurate detection of defects on bottle 200 by an OSW inspection. As a solution, reference is now drawn to FIG. 7, where in an additional non limiting embodiment, a structure 800 for overcoming this short coming is provided.

Figure 7:
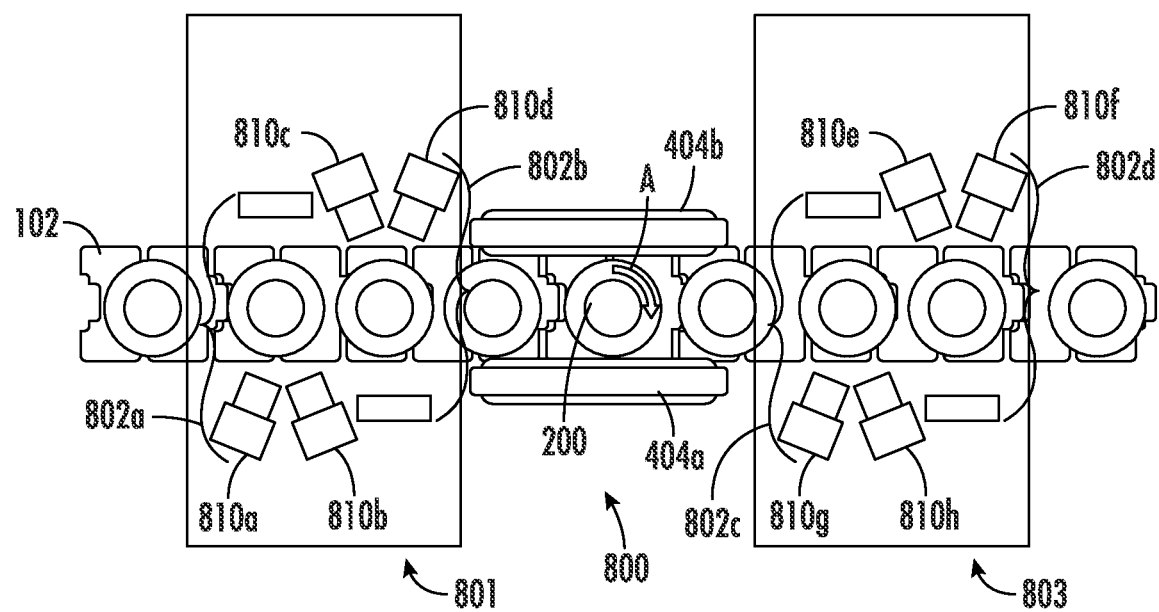
FIG. 7 is a top plain view of the outer sidewall inspection portion of the system constructed in accordance with another embodiment of the invention during operation.

In FIG. 7, in which like numerals describe like structure, an inspection station 800 includes a first camera pair inspection system 801 having a first camera assembly 802a and a second camera assembly 802b; each of which is disposed across conveyor 102. First camera assembly 802a includes two cameras 810a, 810b disposed on a same side of conveyor 102 to face bottle 200 traversing the path on conveyor 102. Second camera assembly 802b includes two cameras 810c, 810d disposed on a same side of conveyor 102 to face bottle 200 on conveyor 102. Cameras 810a, 810b of first camera assembly 802a are disposed on an opposed side of conveyor 102 from cameras 810c, 810d of second camera assembly 802b. In this way, first camera assembly 802a scans a first side of bottle 200 as it traverses the path and second camera assembly 802b scans a second, substantially opposed, side of bottle 200 as it traverses the path, each side with two cameras.

Each camera 810a-810d uses the same optics and lighting as line scan cameras 410a-410d, except each camera 810a-810d is positioned to capture substantially 60 degrees across bottle 200. This allows cameras 810a, 810b, together, in first camera assembly 802a to scan 110 degrees across bottle 200 and cameras 810c, 810d, together, in second camera assembly 802b to scan 110 degrees across bottle 200. Bottle 200 thereafter continues along conveyor 102.

A second camera pair inspection system 803 has a third camera assembly 802c and a fourth camera assembly 802d, each of which is disposed across conveyor 102. As above, camera assembly 802c also includes two cameras 810g, 810h each disposed on a side of conveyor 102 to face bottles 200 traversing the path on conveyor 102. Camera assembly 802d includes cameras 810e, 810f each disposed on the same side of conveyor 102, downstream from camera assembly 802c. Cameras 810g, 810h of third camera assembly 802c are disposed on an opposed side of conveyor 102 from cameras 810e, 810f of fourth camera assembly 802d. Again, each camera 810e-810h uses the same optics and lighting as line scan camera 410a but captures substantially 60 degrees across bottle 200. In this way, third camera assembly 802c scans one, now turned, side of bottle 200 as it traverses the path and fourth camera assembly 802d scans a substantially opposed side of bottle 200 as it traverses the path. As a result of the rotation, the entire surface, 360 degrees, of bottle 200 and its outer side wall have now been scanned, with an additional thirty degrees per bottle side of overlap, by outer sidewall inspection station 800.

As described above, using camera assemblies 802a-802d improves system's 100 sensitivity to defects in the event of shadowing because looking at a smaller angle across bottle 200 per camera 810a-810h improves uniformity of the image, and therefore accuracy, of the overall image from cameras 810a-810h as a whole.

Figure 10:
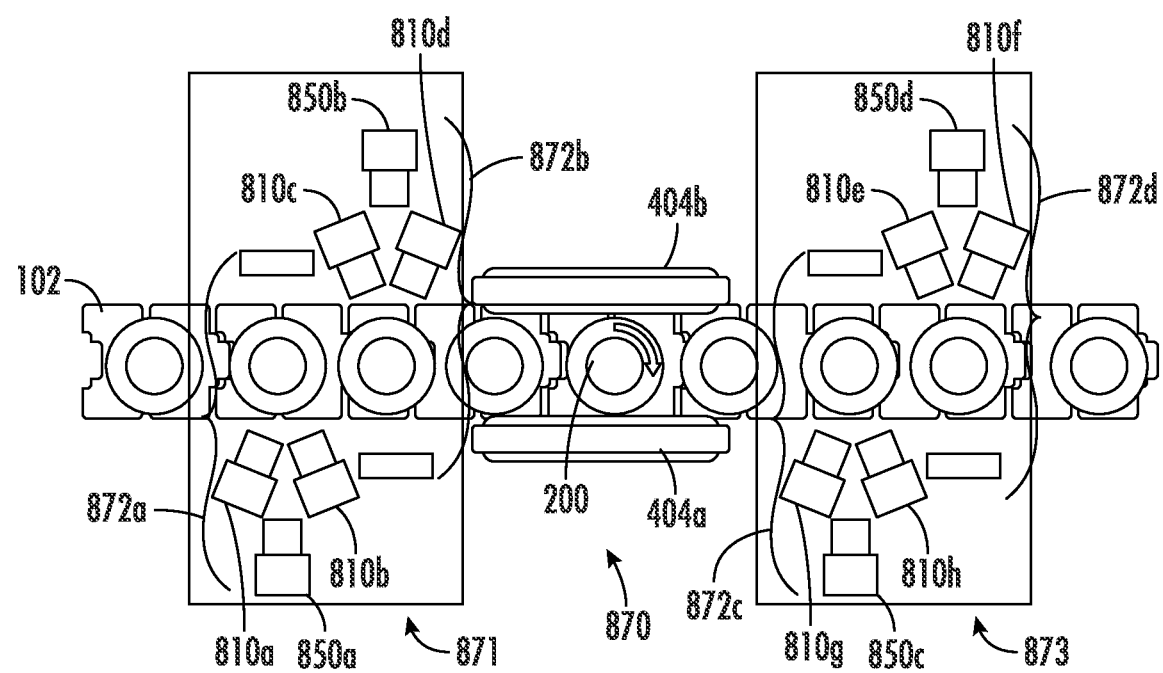
FIG. 10 is a top plain view of the outer sidewall inspection portion of the system constructed in accordance with yet another embodiment of the invention during use.

Another problem in the art is the limited ability to spot degradation of bottle 200. However, a change in color to an Applied Ceramic Label (ACL) is often a sign of degradation. Therefore, in another non-limiting embodiment, as seen in FIG. 10, in which like numerals indicate like structure, an outer sidewall inspection station 870 includes a first camera pair inspection system 871 having a first camera assembly 872a and a second camera assembly 872b, and a second camera pair inspection system 873 having a third camera assembly 872c and a fourth camera assembly 872d. To more easily spot degradation of bottle 200, camera assembly 872a-872d are operationally equivalent to camera assembly 802a-802d, with the exception that each camera assembly 872a-872d also includes a respective ACL camera 850a-850d.

Figure 9:
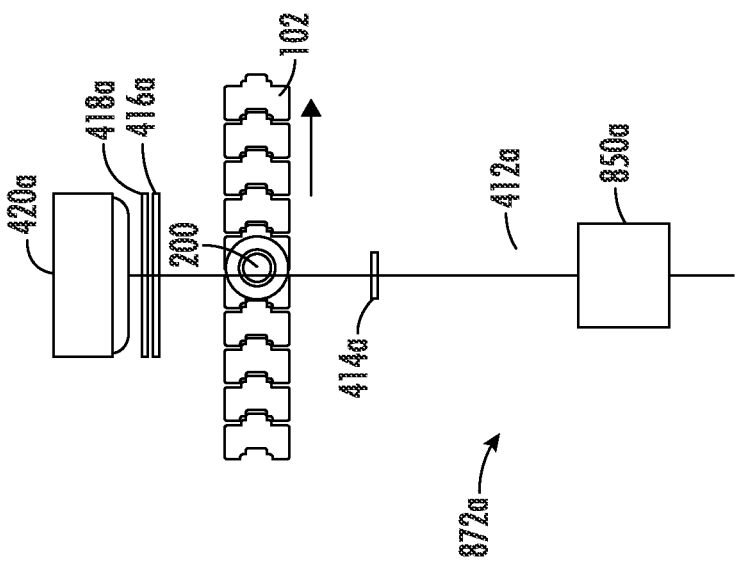
FIG. 9 is a top plain view of the color camera system constructed in accordance with another embodiment of the invention shown inspecting the bottle.
Figure 8:
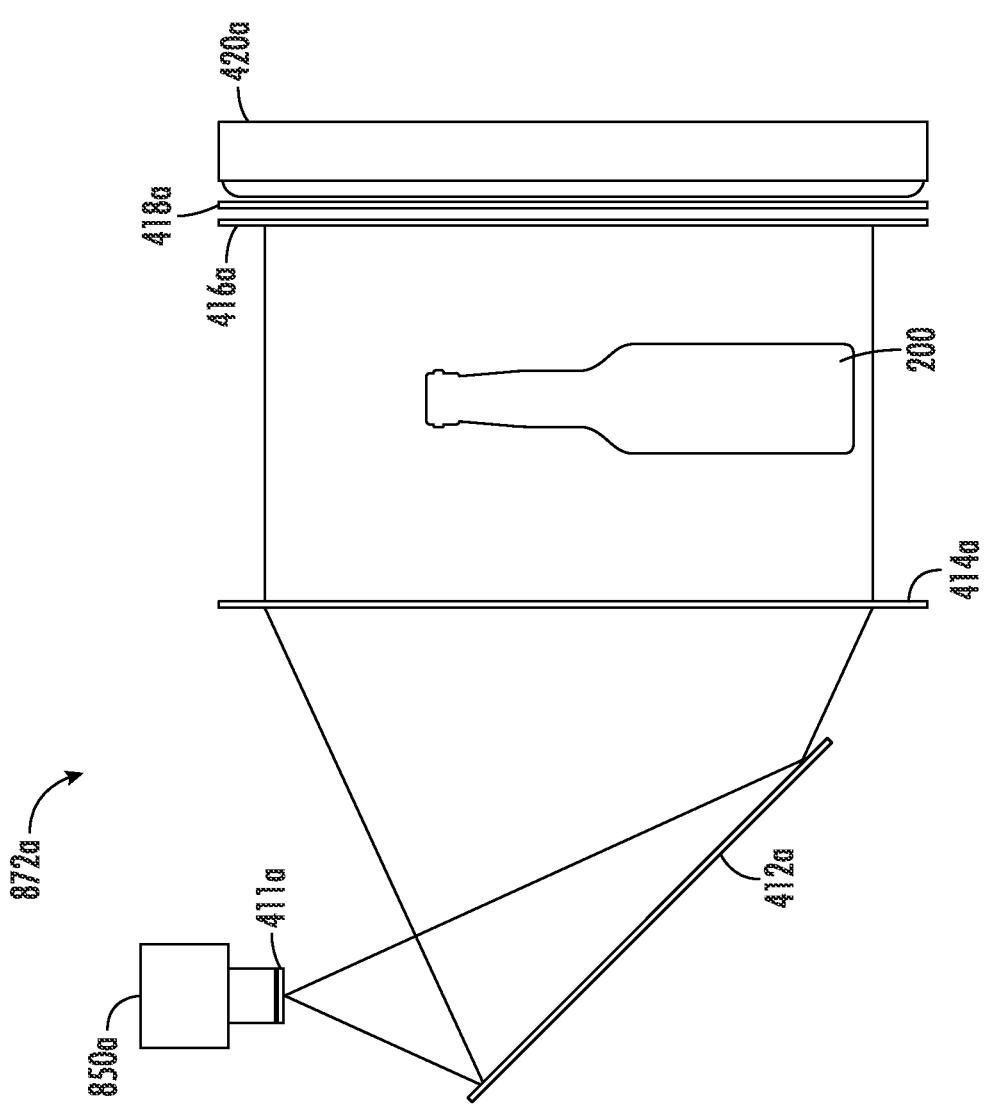
FIG. 8 is a side elevation view of a color camera system constructed in accordance with another embodiment of the invention shown inspecting the bottle.

As shown in FIGS. 8-10, respective ACL cameras 850a-850d are color line scan cameras that use the same optics and lighting as line scan camera 410a, by way of example. This configuration allows ACL cameras 850a-850d to detect various imperfections on bottle 200, such as but not limited to dirt on the ACL, fading of the ACL, and scuffing on bottle 200 by inspecting the label on bottle 200. Since each ACL camera 850a-850d views 110 degrees across bottle 200, the entire bottle 200 is inspected by ACL cameras 850a-850d, with an additional 20 degrees per side of overlap, as bottle 200 passes therebetween outer sidewall inspection station 870.

Figure 11:
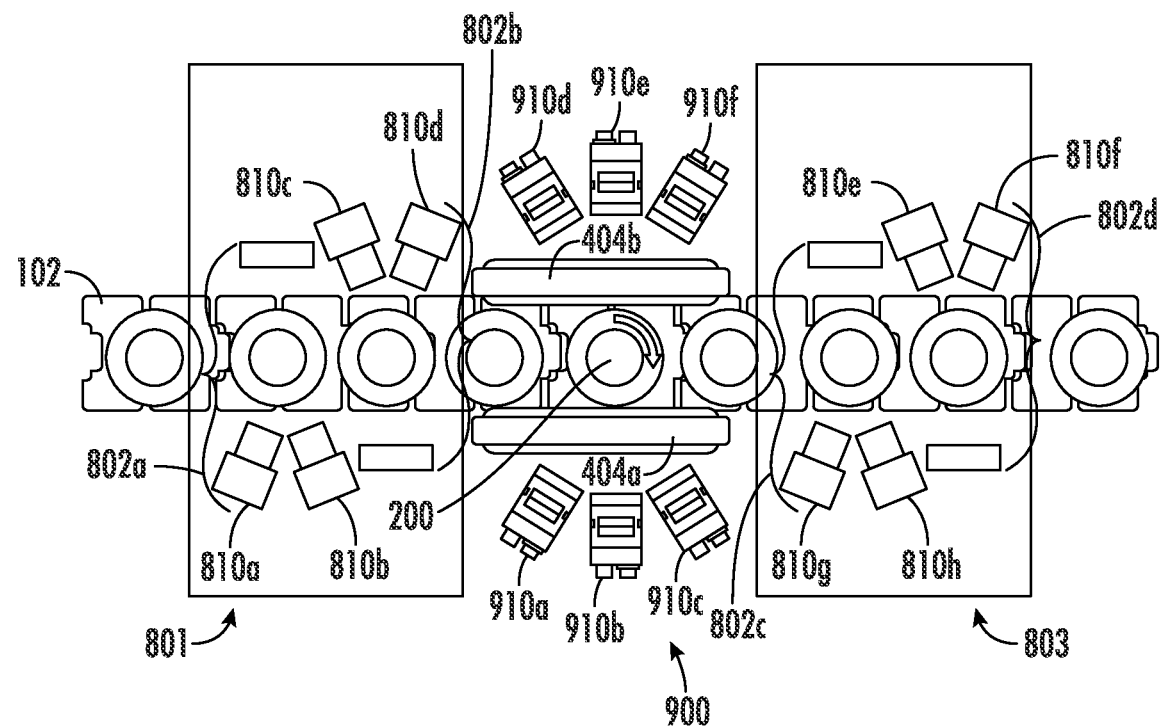
FIG. 11 is a top plain view of the outer sidewall inspection portion of the system constructed in accordance with the yet another embodiment of the invention during use.

In yet another non limiting embodiment shown in FIG. 11, in which like numbers are used to indicate like structures, bottles 200 may include a machine readable optical image, such as an alphanumeric code, barcode, data matrix code, or QR code containing identifying information about each bottle 200. To efficiently track bottle 200, an outer sidewall inspection station 900 includes six, in a non limiting embodiment, track and trace code readers 910a-910f that can identify bottle 200 by the optical code affixed to bottle 200. Track and trace code readers 910a-910c are disposed along the side of conveyor 102 where belt 404a is disposed, and remaining track and trace code readers 910d-910f are disposed along the opposite side of conveyor 102 where belt 404b is disposed to ensure proper capture regardless of bottle orientation. Each track and trace code reader 910a-910f inspects about 70 degrees across bottle 200. Therefore, entire bottle 200 is inspected by track and trace code readers 910a-910f, with an additional sixty degrees of overlap combined, as bottle 200 passes therebetween outer sidewall inspection station 900.

As a result of the above structure an empty bottle inspection system with a smaller footprint and simpler control is provided. No back pressure or complex line controls are required as compared to the prior art linear inspection conveyor. Additionally, accurate bottle positioning for a variety of inspections is provided by the starwheel. The bottles are automatically gapped at appropriate intervals as they leave the starwheel onto the conveyor. Additionally, simplified gapping and queuing is provided for by running the starwheel at a slower speed than the conveyor. Additionally bottle stability during inspection is provided by utilizing the side belts to rotate the bottle but not fully support the bottle as it traverses the OSW inspection process.

It will thus be seen that the objects set forth above, among those made apparent from the preceding description, are efficiently attained and, since certain changes may be made in the construction set forth without departing from the spirit and scope of the invention, it is intended that all matter contained in the above description and shown in the accompanying drawings shall be interpreted as illustrative and not in a limiting sense. Lastly, the use of the line scan cameras for outer side wall inspections provides uniform imaging across a variety of bottle types resulting in improved inspection.

It is also to be understood that the following claims are intended to cover all of the generic and specific features of the invention herein described, and all statements of the scope of the invention which, as a matter of language, might be said to fall therebetween.

What is claimed is:

1. A hybrid starwheel system for inspecting a quality of empty bottles comprises:
   a conveyor conveying one or more bottles along a path in a single direction; the conveyor conveying the one or more bottles at a first speed;
   a starwheel, disposed along the path, receiving each of the one or more bottles from the conveyor, the starwheel rotating at a second speed, relative to the path; the second speed being less than the first speed;
   a sensor disposed adjacent the starwheel for detecting at least one of a residual liquid in any bottle disposed in the starwheel and a defect in one of a base of the bottle, inner sidewall of the bottle, finish of the bottle or a thread of the bottle; the starwheel depositing each bottle on the conveyor at a position along the path downstream of the starwheel;
   an outer sidewall inspection system disposed along the path, downstream of the starwheel, receives each bottle that exits the starwheel; the outer sidewall inspection system has a first camera assembly and a second camera assembly disposed along the path so that each bottle passes between the first camera assembly and the second camera assembly;
   a first belt is disposed along the conveyor, downstream of the second camera assembly, on a first side of the conveyor; a second belt is disposed along the conveyor, downstream of the second camera assembly, on a second side of the conveyor in facing relation with the first belt; the first belt and the second belt rotating the bottle as the bottle passes therebetween, and the outer sidewall inspection system having a third camera assembly and a fourth camera assembly disposed along the path, downstream of the first belt so that each bottle passes between the third camera assembly and the fourth camera assembly.

2. The hybrid starwheel system of claim 1 wherein the first camera assembly comprises:
 a light source disposed along the second side of the conveyor for shining light through the bottle as the bottle passes the light source; and
 at least one line scan camera disposed along the conveyor for receiving the light that has passed through the bottle.

3. The hybrid starwheel system of claim 1 wherein the first camera assembly comprises:
 a light source disposed along the second side of the conveyor for shining a light through the bottle as the bottle passes the light source; and
 a color line scan camera disposed along the conveyor for receiving the light that has passed through an applied ceramic label affixed thereon the bottle.

4. The hybrid starwheel system of claim 1 wherein the outer sidewall inspection system further comprises:
 a code reader assembly disposed along the conveyor for tracking the bottle along the path; the code reader assembly having at least one track and trace code reader, disposed along the conveyor to scan a machine readable optical image affixed to the bottle.

5. The hybrid starwheel system of claim 1 wherein the first camera assembly is disposed upstream of the second camera assembly and the third camera assembly is disposed upstream of the fourth camera assembly.

6. The hybrid starwheel system of claim 1 wherein the first belt travels at a first speed and the second belt travels at a second speed, different than the first speed, to rotate the bottle relative to the first camera assembly.

7. The hybrid starwheel system of claim 1, the system further comprising:
 at least one rejector disposed along the conveyor for deflecting the bottle off of the conveyor for further testing.

8. The hybrid starwheel system of claim 7, wherein the at least one rejector is disposed downstream of the fourth camera assembly.

9. The hybrid starwheel system of claim 5, wherein at least the first camera assembly comprises:
 a light source disposed along the first side of the conveyor for shining a light through the bottle as the bottle passes the light source; at least one line scan camera disposed along the conveyor for receiving the light that has passed through the bottle; a color line scan camera disposed along the conveyor for receiving the light that has passed through an applied ceramic label affixed to the bottle;
 a code reader assembly disposed along the conveyor for tracking the bottle along the path; the code reader assembly having at least one track and trace code reader to scan a machine readable optical image affixed to the bottle;
 wherein the first belt travels at a first speed and the second belt travels at a second speed, different than the first speed to rotate the bottle relative to the first camera assembly; and at least one rejector disposed along the conveyor, downstream of the fourth camera assembly, for deflecting the bottle off of the conveyor for further testing.

10. An outer sidewall inspection system for detecting an outer sidewall of an empty bottle travelling along a conveyor, comprising:
 a first camera assembly and a second camera assembly, disposed along a path defined by the conveyor, so that each bottle passes between the first camera assembly and the second camera assembly;
 a first belt disposed along the conveyor, downstream of the second camera assembly, on a first side of the conveyor; a second belt is disposed along the conveyor, downstream of the second camera assembly, on a second side of the conveyor in facing relation with the first belt; the first belt and the second belt are configured to rotate the bottle as the bottle passes therebetween while being supported by the conveyor;
 a code reader assembly disposed along the conveyor for tracking the bottle along the path; the code reader assembly having at least one track and trace code reader to scan a machine readable optical image affixed to the bottle; and
 the outer sidewall inspection system having a third camera assembly and a fourth camera assembly disposed along the path, downstream of the first belt so that each bottle passes between the third camera assembly and the fourth camera assembly; wherein at least the first camera assembly includes a light source disposed along the second side of the conveyor for shining a light through the bottle as the bottle passes the light source; and at least one line scan camera disposed along the conveyor for receiving the light that has passed through the bottle.

11. The outer sidewall inspection system of claim 10 wherein the first camera assembly is disposed upstream of the second camera assembly and the third camera assembly is disposed upstream of the fourth camera assembly.

12. The outer sidewall inspection system of claim 10, wherein at least the first camera assembly further comprises:
 a color line scan camera disposed along the conveyor for receiving the light that has passed through an applied ceramic label affixed to the bottle.

13. The outer sidewall inspection system of claim 10, wherein the first belt travels at a first speed and the second belt travels at a second speed, different than the first speed, to rotate the bottle relative to the first camera assembly.

14. The outer sidewall inspection system of claim 10, wherein at least the first camera assembly further comprises:
 a color line scan camera disposed along the conveyor for receiving the light that has passed through an applied ceramic label affixed to the bottle.

15. The outer sidewall inspection system of claim 11, the system further comprising:
 a code reader assembly disposed along the conveyor for tracking the bottle along the path; the code reader assembly having one track and trace code reader to scan a machine readable optical image affixed to the bottle;
 a color line scan camera disposed along the conveyor for receiving the light that has passed through an applied ceramic label affixed thereon the bottle; and
 wherein the first belt travels at a first speed and the second belt travels at a second speed, different than the first speed, to rotate the bottle relative to the first camera assembly.

* * * * *